Feb. 8, 1927.

E. GRANAT 1,616,794

ELECTRIC DIFFERENTIAL CONTROL SYSTEM

Filed April 6, 1925    4 Sheets-Sheet 1

Inventor
E. Granat
By Marks Clerk
Attys

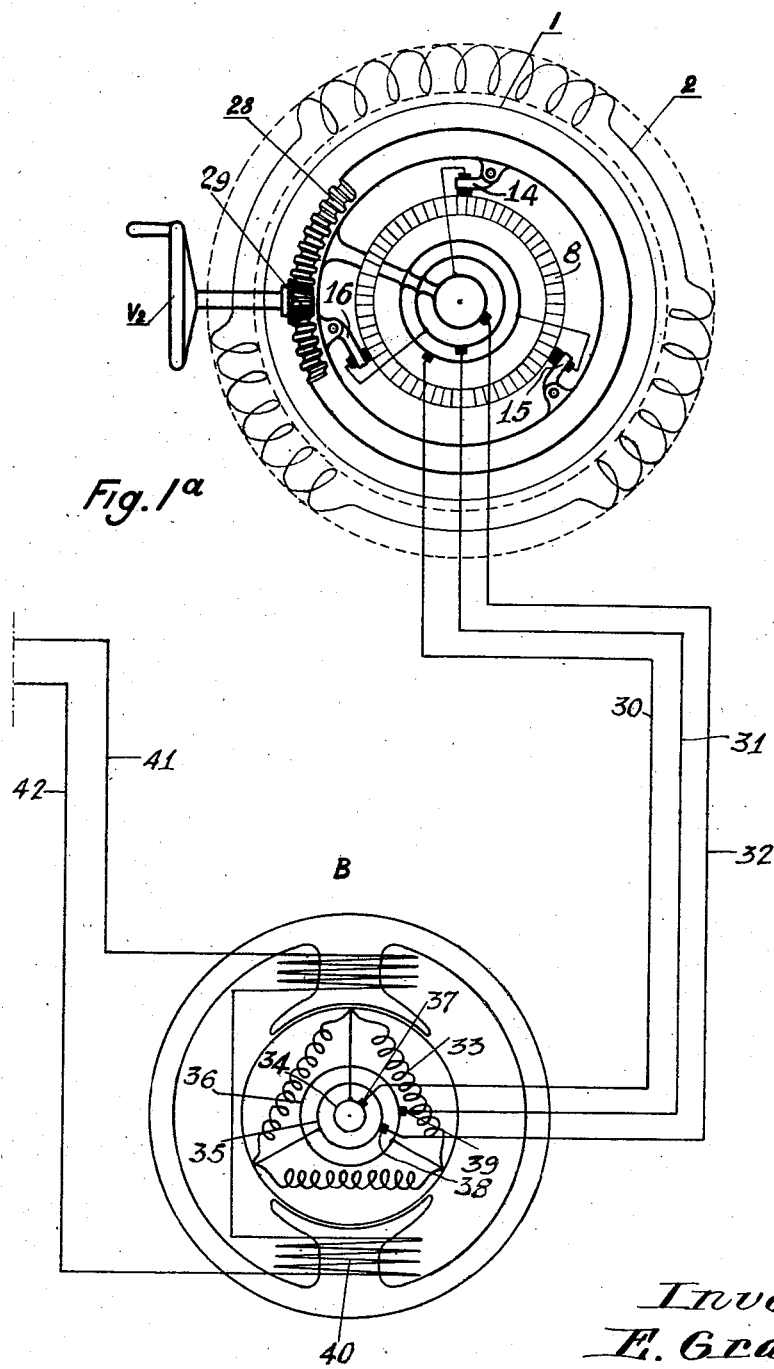

Feb. 8, 1927.　　　　　　　　　　　　　　　　　　　　1,616,794
E. GRANAT
ELECTRIC DIFFERENTIAL CONTROL SYSTEM
Filed April 6, 1925　　　4 Sheets-Sheet 3
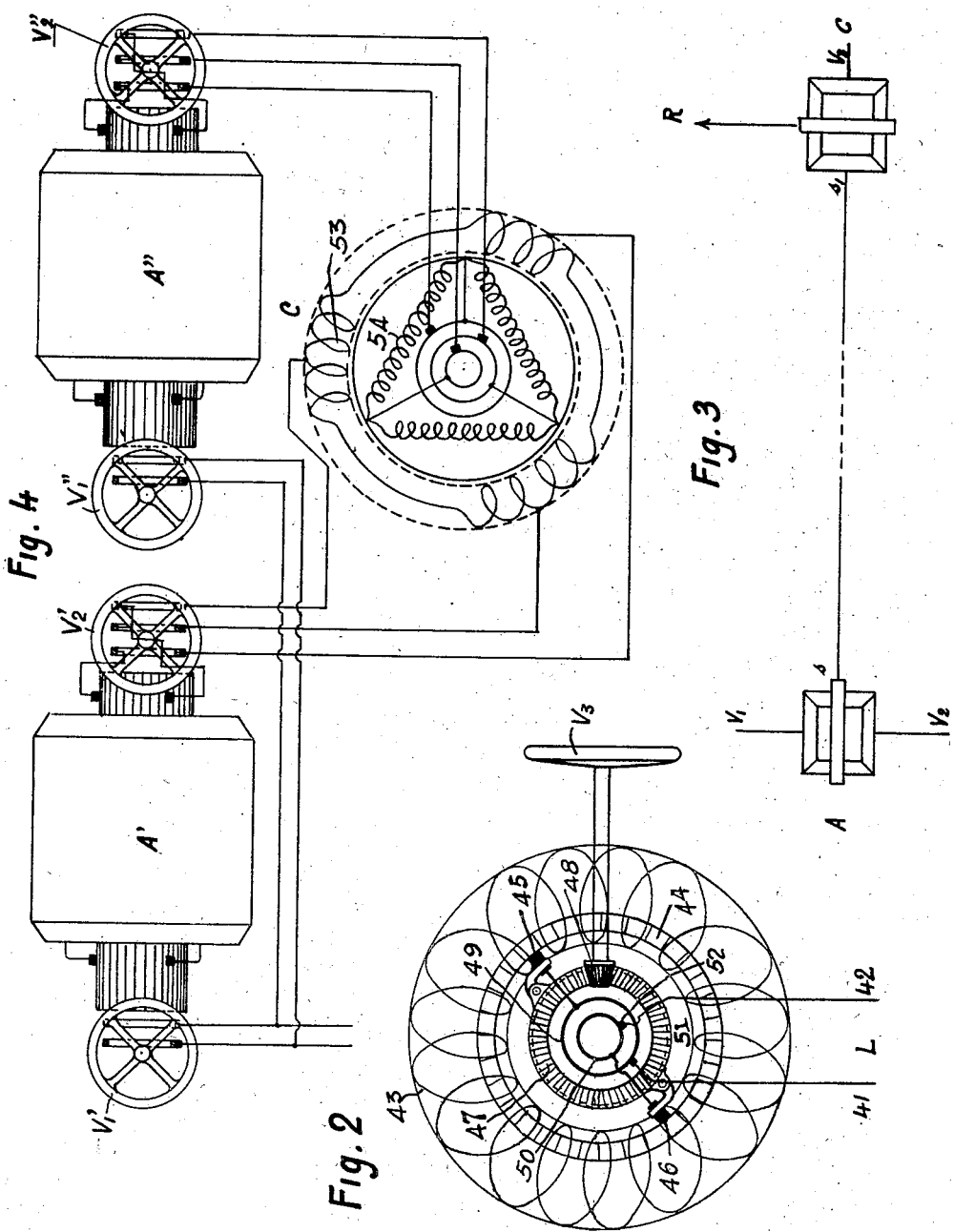

Feb. 8, 1927.
E. GRANAT
1,616,794
ELECTRIC DIFFERENTIAL CONTROL SYSTEM
Filed April 6, 1925   4 Sheets-Sheet 4
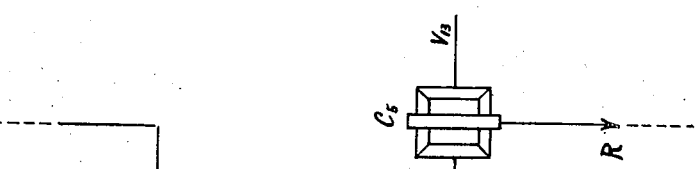
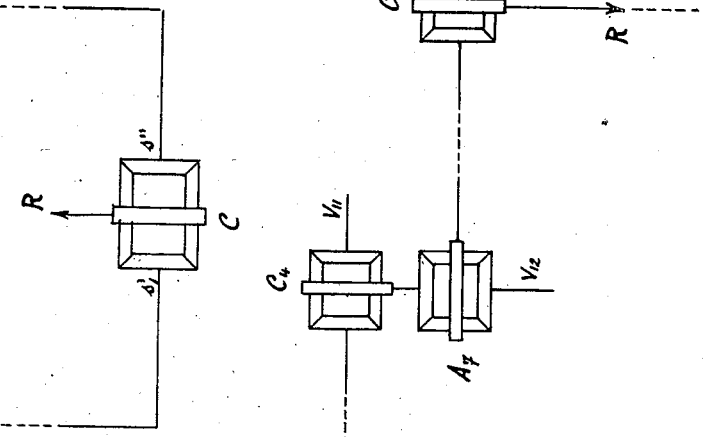
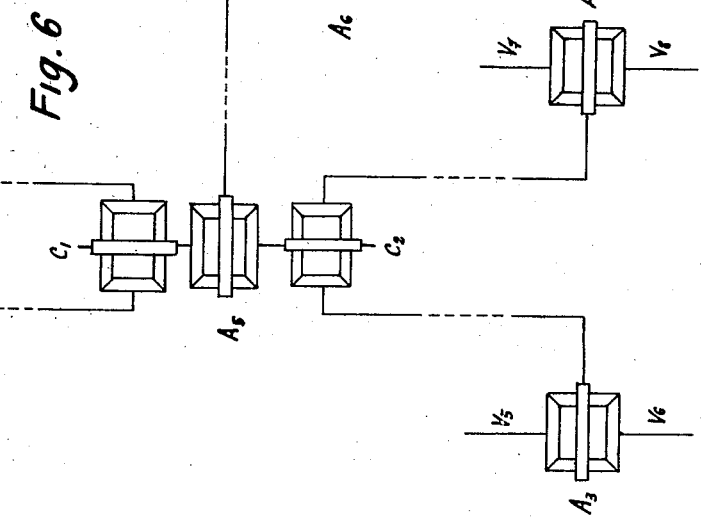
Fig. 5
Fig. 6
Inventor
E. Granat
By Marks&Clerk
Attys.

Patented Feb. 8, 1927.

1,616,794

UNITED STATES PATENT OFFICE.

ELIE GRANAT, OF PARIS, FRANCE.

ELECTRIC DIFFERENTIAL CONTROL SYSTEM.

Application filed April 6, 1925, Serial No. 21,175, and in France April 19, 1924.

The French Patent 540,353 dated January 14th, 1921, entitled "Electric distant control system" describes a distance control system the transmitting device of which is an electric D. C. machine (generator or motor) comprising a stationary field piece, an armature with a commutator fed with D. C. by stationary brushes and on said commutator a set of three equidistant movable brushes borne by the controlling device of the system and gathering, when a suitable rotation is imparted to them, variable potentials. These movable brushes are thus adapted to send a polyphase current in the line wires connecting them with the receiving device, which comprises an auto-synchronous motor, one of its parts, stator or rotor, bearing a polyphase winding fed by the above-mentioned line wires and the other part bearing a closed winding fed with D. C. in two predetermined opposite points. In a control system of this kind, each position of the set of rotating brushes of the transmitting device gives one only corresponding position for the movable part of the receiver, with which the device to be controlled is connected.

In the above-mentioned patent it is stated that it is possible to superimpose on the described rotation of the controlling device thus transmitted a second transmitted rotation by making the field piece of the transmitting device movable. Thus a differential control system is created. However from a mechanical standpoint, this second transmission is not easy to execute.

The invention described hereinafter has for its object an electric differential control system comprising two electrically working controlling devices the rotations of which are to be algebraically added on receiving device.

In the differential control device which has been recalled to mind hereinabove, the rotation of the field piece of the transmitting device causes a modification in the distribution of the potentials under the movable brushes. This result can be obtained electrically by using a rotating field such as that described in French Patent No. 564,858 to Granat, dated July 22nd, 1922, and entitled "Electric control system". According to this patent which refers to an electric control system of the same type as the first mentioned one, the field piece of the transmitting device is provided with a three-phase supplementary winding fed by the three movable brushes rubbing on the commutator of the armature and actuated by the controlling device of the system. By these means, a supplementary field is caused to arise in the field piece, said field rotating at the same speed as the brushes, whereby the commutation under these is facilitated.

According to my present invention, the electric control system which is the object of the first above-mentioned patent is modified so as to act as a differential control system. This is achieved by providing the field piece of the transmitting device with a single three-phase or $n$-phase winding fed by 3 or $n$ stationary brushes rubbing on the commutator of the armature and by feeding this same commutator with D. C. by means of two D. C. feeding brushes borne by a movable part controlled by a second controlling device. Any angular displacement of the movable part bearing these feeding brushes will change the direction of the inducing field and thereby the distribution of the potentials around the commutator. Thus the three movable brushes from which the line wires start will convey to the receiving device, not only the variations of the potentials which arise by reason of their own displacement, but also those which are caused by the rotation of the two D. C. feeding brushes. This provides for a differential control system which adds up algebraically on the receiving device the rotations of both controlling devices. By providing the stator or field piece of the receiving motor with a closed winding connected with the sections of a commutator and by mounting round this commutator movable feeding brushes controlled through a third controlling device, a third movement can be added on receiving the device.

This system can even be made to serve as a more complete differential system whereby the algebraical adding of four movements is possible. For this purpose, the receiving device should be an auto-synchronous motor, provided with two three-phase windings of which one is on the stator and the other on the rotor; said windings are respectively fed by the line-wires of two transmitting devices of the type described hereinabove. Each variation of the distribution of the potentials in one or the other of the receiving windings causes a rotation of the movable part. As these variations correspond for one of the windings to the algebraic sum of the rotations of the two controlling devices of the first transmitting device, and for the other winding to the algebraic sum of the rotations of the two controlling devices of the second transmitting device, the movements of the four controlling devices are finally added by the receiver.

The above described systems can evidently be modified and combined one with the other in a great number of ways. For instance the receivers of two control-systems can be used to actuate the two controlling devices of a third system the receiver of which will thus add up the sums given by the two first systems.

By way of example, a form of execution is described hereinbelow and set forth on appended drawings for each of these species of differential control systems either simple or double.

Fig. 2 shows a correcting device for the control system corresponding to Fig. 1 and Fig. 3 is a diagrammatical sketch of the control system provided with said correcting device.

Fig. 4 shows a double differential control system of which Fig. 5 is a diagrammatical sketch.

Fig. 6 is a diagrammatical view of a multiple differential control system for algebraically adding any number of rotations.

Figure 1:
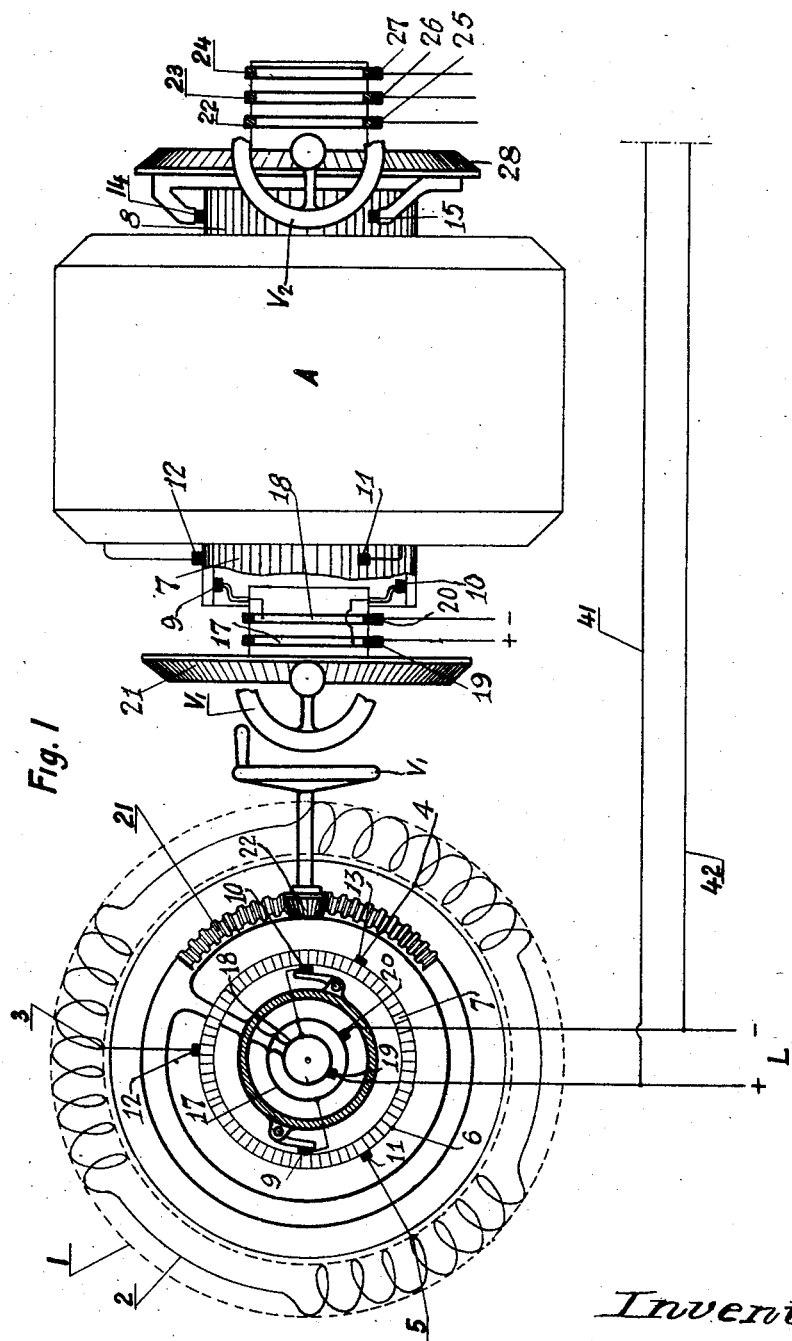
Fig. 1 shows diagrammatically a simple differential system. In the top central part A of the figure, the transmitting device is shown in side elevation and on the left side and in Fig. 1ª a diagram of the corresponding end is drawn.

According to Figs. 1 and 1ª, the control system comprises a transmitting device A and a receiving device B.

The transmitting device A comprises a stationary field piece 1 provided with a three-phase winding 2 fed in three equidistant points 3, 4 and 5. Inside the field piece is the armature (of which the winding is not shown), provided with a commutator 6 comprising two parts 7 and 8, one at each end of the armature. This commutator is fed with D. C. by means of the line wire L through the two brushes 9 and 10 rubbing on the part 7. Round the commutator 7 are disposed three stationary brushes 11, 12 and 13 which are respectively connected with the above-mentioned points 3, 4 and 5 ending each phase of the field winding 2. The two D. C. feeding brushes 9 and 10 are mounted on a movable part which also bears two collecting rings 17 and 18 on which rub two brushes 19 and 20 connected with the line wires L. This movable part also bears a gear wheel 21 the rotation of which is controlled by a pinion 22 mounted on the end of the shaft of the controlling wheel $V_1$.

Three equidistant movable brushes 14, 15, 16 are adapted to rub on the right hand side 8 of the commutator of the transmitting device A. Their rotation can be controlled by means of the gear wheel 28 through the pinion 29 mounted on the end of the shaft of the controlling wheel $V_2$. The three brushes 14—15—16 are respectively connected with the three collecting rings 22—23—24 mounted on a movable part upon which rub the brushes 25—26—27 which are the starting points of the three line wires 30—31—32 of the control system.

The receiver B comprises a rotor provided with a three-phase winding 33, a delta winding for instance, the three apices of which are connected respectively with three collecting rings 34, 35 and 36 upon which rub the three brushes 37—38—39 which are the terminals of the line wires 30—31—32. The stator of receiver B comprises a winding 40 on a bipolar field piece; this winding is fed with D. C. through derivations 41—42 of the line wires L.

The control system works in the following manner: The connections between each of the stationary brushes and the three-phase winding on the field piece are such that the field of the stator is at right angles with that of the rotor. It is evident that if these fields are at right angles for one position of the movable brushes 9 and 10 they will be so for any other position; the rotor field rotates of course with the movable brushes through which the said rotor is fed whereas the stator field is fed through the connections 12—3, 13—4 and 11—5 by the stationary brushes 12, 13 and 11 the phases of which vary according to the angle of the movable brushes with the said stationary brushes whereby the stator field rotates by the same amount as the rotor field and remains perpendicular thereto.

If a given position of the D. C. brushes is considered, any rotation of the controlling wheel $V_2$ actuating the three three-phase movable brushes 14—15—16 will cause the field of the receiving armature 33 to rotate by a corresponding amount and, as the inducing field of the receiver B has a constant direction, it will also cause a corresponding rotation of the armature 33.

Moreover any rotation of the D. C. brushes 9 and 10 through rotation of the wheel $V_1$ will make the resulting field of the field piece 2 rotate by a corresponding amount and will cause under the movable brushes 14—15—16 and in the receiving armature 33, a corresponding rotation of the field and thereby a corresponding rotation of armature 33.

The rotations of both wheels $V_1$ and $V_2$ producing thus a corresponding rotation of the armature 33, it is evident that the rotation of said armature will be the algebraic sum of the successive rotations given to both wheels.

On Fig. 2 is shown a modification to the inducing stator of receiver B by means of which a third movement can be added by an electrical control system, on the receiver itself to those transmitted by the wheels $V_1$ and $V_2$. In view of this, the field piece is provided with a closed winding 43 and bears a commutator 44. Two brushes 45—46 rub on this commutator and are borne by a movable part provided with a gear wheel 47 engaging with a pinion 48 actuated by the correcting wheel $V_3$. Said movable part is provided with two collecting rings 49—50 connected with the brushes 45—46. The two brushes 51—52 forming the terminals of the wires 41—42 distributing the direct current are adapted to rub on said collecting rings. The rotor is similar to the one shown on Fig. 1 for receiver B.

By making the brushes 45—46 turn by hand, the points where the direct current enters and goes out of the field piece are changed which means that a corresponding rotation will be imparted to the inducing field and thereby to the rotor 33. This arrangement allows a correction to be made at the receiving station B, correction which is special to said station. This can be most useful, especially when the transmitting device A controls several receivers such as B.

Figure 3 shows diagrammatically this arrangement. The signs which usually indicate the mechanical differential systems are here used for indicating the several electric differential systems. A is the origin of the control system. The primary gear $V_1$ indicates the first controlling wheel $V_1$ and the movable set of D. C. brushes 9—10 of the transmitting device. The secondary gear $V_2$ corresponds to the controlling wheel $V_2$ and to the set of three-phased brushes 14—15—16 of transmitting device. The set of planetary wheels $s$ corresponds to the three brushes 25—26—27 which are the starting points of the line wires of the control system and through which passes the differential current arising from the interaction of the two windings. At the other end of the transmission in C the primary $s$, corresponds to the three three-phased brushes 37—38—39 of the receiver which receive the electric impulses. The secondary $V_3$ corresponds to the D. C. brushes 45—46 actuated by the controlling wheel $V_3$; the set of planetary wheels R corresponds to the rotor 33 the rotation of which is the algebraic sum of the rotations of the three controlling wheels $V_1 V_2 V_3$.

The double differential system shown on Fig. 4 comprises two transmitting devices A' A" similar to the transmitting device A of Figure 1 and a receiving device C constituted by an auto-synchronous motor both parts of which are provided with three-phased windings. The stator or field piece winding is connected with the three line wires starting from the transmitting device A'. The rotor or armature 54 is connected with the three line wires starting from the transmitting device A" through three collecting rings on which rub three brushes connected with the terminals of said line wires. Any rotation of the controlling wheels $V'_1$, or $V'_2$ of the transmitting device A' will cause a corresponding rotation of the direction of the inducing field in 53. In a similar way, any rotation of the controlling wheels $V''_1$ or $V''_2$ of the transmitting device A" will cause a corresponding rotation of the direction of the induced field of the rotor 54. Therefore the rotation of the rotor 54 with reference to the stator 53 will be the algebraical sum of the movements of the four controlling wheels $V'_1 V'_2 V''_1$ and $V''_2$.

This double control system is shown diagrammatically on Fig. 5 in a similar manner to that of diagram on Fig. 3. It therefore requires no special explanation.

By controlling the wheels $V_1 V_2$ of another transmitting device A by the receivers of two control systems or by a receiver and a controlling handwheel a great number of different arrangements can be devised whereby the differential control systems are brought to add up algebraically any desired number of indications.

The control system shown by way of example on Fig. 6 can be described in the following manner: A double control system comprises the two transmitting devices $A_1$ (the controlling wheels of which are $V_1$ and $V_2$) and $A_2$ with the controlling wheels $V_3$ and $V_4$ and the receiver $C_1$; another double control system comprises two transmitting devices $A_3$ (wheels $V_5$ and $V_6$) and $A_4$ (wheels $V_7$ and $V_8$) and the receiver $C_2$. The two receivers $C_1$ and $C_2$ control the controlling wheels of the transmitting device $A_5$, the receiver of which is $C_3$. In this receiver $C_3$ is added the rotation of the handwheel $V_9$ (in the manner shown on Fig. 2) and the rotor of said receiver $C_3$ controls one of the controlling wheels of the transmitting device $A_6$ whilst the other controlling wheel $V_{10}$ of said device is rotated independently. The receiver $C_4$ of this transmitting device $A_6$ to which is imparted moreover the rotation of the wheel $V_{11}$ actuates one of the two controlling wheels of the next transmitting device $A_7$ . . . and so on.

What I claim is:

1. An electric differential control arrangement for adding up algebraically the measurements of a certain number of controlling parts comprising an electric transmitting machine having a field piece provided with an $n$-phase winding and an armature provided with two commutators, a set of two diametrically opposed movable brushes fed with D. C. engaging one of said commutators, means whereby said brushes are controlled by one of the controlling parts, a set of $n$ stationary brushes engaging said commutator and respectively connected with the phases of the field piece of the transmitting machine, another set of $n$ movable brushes engaging the other commutator and controlled by another controlling part and a receiving motor comprising two components one of which is provided with an $n$-phase winding connected with the last mentioned set of brushes and the other component of which is energized at equidistant points.

2. An electric differential control arrangement for adding up algebraically the measurements of a certain number of controlling parts comprising an electric transmitting machine having a field piece provided with an $n$-phase winding and an armature provided with two commutators, a set of two diametrically opposed movable brushes fed with D. C. engaging one of said commutators, means whereby said brushes are controlled by one of the controlling parts, a set of $n$ stationary brushes engaging said commutator and respectively connected with the phases of the field piece of the transmitting machine, another set of $n$ movable brushes engaging the other commutator and controlled by another controlling part and a receiving motor comprising two components one of which is provided with an $n$-phase winding connected with the last mentioned set of brushes and the other component of which is energized at two opposite points by means of direct current.

3. An electric differential control arrangement for adding up algebraically the measurements of a certain number of controlling parts comprising an electric transmitting machine having a field piece provided with an $n$-phase winding and an armature provided with two commutators, a set of two diametrically opposed movable brushes fed with D. C. engaging one of said commutators, means whereby said brushes are controlled by one of the controlling parts, a set of $n$ stationary brushes engaging said commutators and respectively connected with the phases of the field piece of the transmitting machine, another set of $n$ movable brushes engaging the other commutator and controlled by another controlling part and a receiving motor comprising two components one of which is provided with an $n$-phase winding connected with the last mentioned set of brushes and the other component of which is provided with a commutator, a set of two movable brushes fed with D. C. engaging last mentioned commutator and controlled by a third controlling part.

4. An electric differential control device comprising a series of arrangements as claimed in claim 1, the receiving motor of each arrangement being adapted to control one of the controlling parts of the following arrangement.

In witness whereof he has hereunto set his hand.

ELIE GRANAT.